United States Patent
Koch et al.

(10) Patent No.: US 6,921,552 B1
(45) Date of Patent: Jul. 26, 2005

(54) FABRICATION OF ZINC OXIDE FILMS ON NON-PLANAR SUBSTRATES AND THE USE THEREOF

(75) Inventors: Michael Herman Koch, Erskineville (AU); Robert Norman Lamb, Engadine (AU); Gock Leong Mar, Lane Cove (AU); Peter Yorke Timbrell, Ontario (CA)

(73) Assignee: Unisearch Limited, Randwick (AU)

( * ) Notice: Subject to any disclaimer, the term of this patent is extended or adjusted under 35 U.S.C. 154(b) by 0 days.

(21) Appl. No.: 09/403,505
(22) PCT Filed: May 6, 1998
(86) PCT No.: PCT/AU98/00326
§ 371 (c)(1),
(2), (4) Date: Feb. 1, 2000
(87) PCT Pub. No.: WO98/50316
PCT Pub. Date: Nov. 12, 1998

(30) Foreign Application Priority Data

May 6, 1997 (AU) .............................................. PO6635

(51) Int. Cl.$^7$ ............................. B05D 5/06; C23C 16/00
(52) U.S. Cl. .................... 427/163.2; 427/168; 427/226; 427/372.2; 427/255.24
(58) Field of Search .............................. 427/226, 163.2, 427/168, 255.24, 372.2, 561

(56) References Cited

U.S. PATENT DOCUMENTS

| | | | |
|---|---|---|---|
| 3,860,444 A | * | 1/1975 | Donckel et al. ............ 427/593 |
| 3,940,357 A | | 2/1976 | Fahey |
| 4,418,984 A | | 12/1983 | Blair et al. |
| 4,509,997 A | * | 4/1985 | Cockayne et al. ...... 427/255.33 |
| 4,575,463 A | | 3/1986 | Biswas et al. ............... 427/163 |
| 4,592,932 A | | 6/1986 | Biswas et al. ............... 427/163 |
| 4,751,149 A | * | 6/1988 | Vijayakumar et al. . 427/255.33 |
| 4,790,625 A | * | 12/1988 | Biswas et al. ............... 385/128 |
| 5,168,540 A | * | 12/1992 | Winn et al. .................. 385/128 |
| 5,246,734 A | | 9/1993 | Michael et al. |
| 5,258,204 A | * | 11/1993 | Wernberg et al. ....... 427/255.19 |
| 5,595,793 A | | 1/1997 | Neuberger et al. |

OTHER PUBLICATIONS

Ky et al; 400 MHz–Bandwidth All–Fiber Phase Modulators with ZnO Coating on Standard Telecommunication Fiber; IEEE Photonics Technology Letters; vol. 8, No. 5; May 1996; pp. 629–631.

* cited by examiner

Primary Examiner—Brian K. Talbot
(74) Attorney, Agent, or Firm—Foley & Lardner (57) ABSTRACT

A method of manufacture of a substantially continuous circumferential coating on a non-planar substrate, is disclosed the method comprising the steps of: utilising a substantially non directional deposition technique and a substantially static substrate deposition geometry to deposit the coating. Coatings can be deposited which include piezo-electric modulation characteristics or electro-optic modulation characteristics. Ideally the coating has semiconducting properties. The type of coating ideally includes Zinc-Oxide coatings. The non directional deposition technique can comprise chemical vapor deposition via single source chemical vapor deposition. Suitable substrates include optical fibers which are clamped onto a substantially planar heating surface during the deposition. The optical fiber can be clamped at a portion of the length of the fiber which is located at one end of a heating surface during the deposition such that movement of a free end of the optical fiber is limited to movement substantially along the axis of the optical fiber.

12 Claims, 8 Drawing Sheets

FABRICATION OF ZINC OXIDE FILMS ON NON-PLANAR SUBSTRATES AND THE USE THEREOF

FIELD OF THE INVENTION

The present invention relates to the fabrication of Zinc Oxide films on non-planar substrates such as optical fibres and their use in devices such as piezo-electric or electro optic modulators.

BACKGROUND OF THE INVENTION

Figure 1:
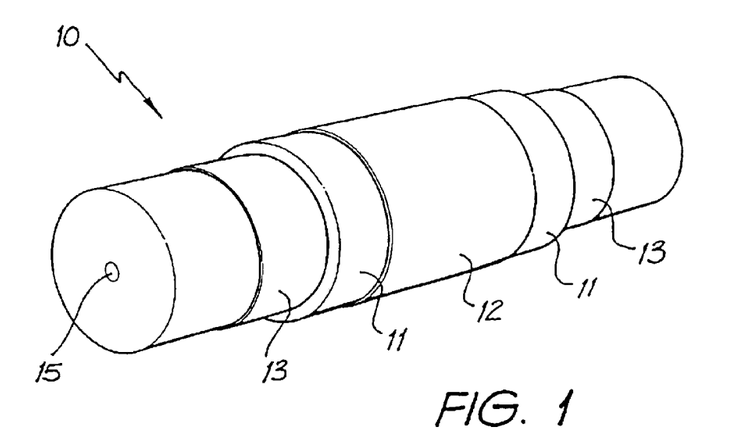
FIG. 1 is a schematic of a typical thin film acousto-optic fibre phase modulator.

Recently, there has been a growing interest in the development of thin film piezo-electric materials for use in all fibre acousto-optic modulators. In FIG. 1 there is illustrated a schematic representation of the typical modulator device structure 10 where a film of active material 11 (typical thickness from 5 to several 10's of $\mu$m) is sandwiched between two electrical contact layers 12, 13 (thicknesses up to 1 $\mu$m) covering a full 360° surface of a fibre. The cylindrical geometry of such devices 10 results in highly efficient polarisation independent modulators as the acoustic waves are focussed at the fibre core 15.

The active material 11 can be Zinc Oxide (ZnO) which is a II–VI semiconductor with strong piezo-electric and electro-optic properties ideal for use in compact thin film fibre modulators with frequency responses up to 1 GHz. In crystalline zinc oxide, the c-axis is a polar axis due to effective ionic charges between the alternating Zn and O layers. It is therefore important that the ZnO thin film structure is one in which the crystallites are oriented with their c-axis parallel to the applied electric field.

To date ZnO films used in the fabrication of all-fibre modulators have been deposited using various forms of sputtering from a ZnO target. The devices previously constructed have had limited maximum attainable efficiency and phase modulation. Further, with utilising sputtering, rotation of the optical fibre was required due to the directional nature of the high energy deposition process. This was found to have an undesirable affect on device performance. Further, the most important limiting factor in these devices appears to be the non-negligible conductivity of the deposited films.

SUMMARY OF THE INVENTION

It is an object of the present invention to provide for an improved method of fabrication of zinc oxide films on non-planar substrates such as optical fibres of the like. Further, it is an object of the present invention to construct devices utilizing the aforementioned improved films.

In accordance with a first aspect of the present invention, there is provided a method of manufacture of a substantially continuous circumferential coating on a non-planer substrate, the method comprising the steps of: utilising a substantially non directional deposition technique and a substantially static substrate deposition geometry to deposit the coating.

Coatings can be deposited which include piezo-electric modulation characteritics or electro-optic modulation characteristics. Ideally the coating has semiconducting properties. The type of coating ideally includes Zinc-Oxide coatings.

The non directional deposition technique can comprise chemical vapour deposition via single source chemical vapour deposition.

Suitable substrates include optical fibres which are clamped onto a substantially planar heating surface during the deposition. The optical fibre can be clamped at a portion of the length of the fibre which is located at one end of a heating surface during the deposition such that movement of a free end of the optical fibre is limited to movement substantially along the axis of the optical fibre.

In accordance with a second aspect of the present invention, there is provided a receptacle for an optical fibre arranged to be used in a method of manufacture of a circumferential coating on an optical fibre utilising a substantially non directional deposition technique and a substantially static substrate deposition geometry, the receptacle comprising: a substantially planar heating surface; a clamping means for clamping the substrate fibre onto the heating surface, wherein the clamping means is arranged to clamp the fibre at a portion of the length of the optical fibre which is located at one end of the heating surface during the manufacture of the coating; and means for limiting a movement of a free end of the optical fibre to movement substantially along axis of the optical fibre.

In accordance with a further aspect of the present invention, there is provided an acusto-optical phase modulator having a phase modulation efficiency greater than substantially 0.25 rad/√FMW/cm and further preferably having a substantially linear relationship between phase modulation and driving power for driving powers greater than 36 mW.

It has been found in practice that, through the utilisation of chemical vapour deposition techniques, acusto-optical phase modulators having higher levels of efficiency, in excess of 0.25 radiums/√MW/cms, can be constructed. Further, phase modulators utilising the aforementioned techniques have been found to have substantially higher phase modulation capabilities than previously possible. This allows for their incorporation in interferometric optic arrangements which have improved phase modulation characteristics.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

In the preferred embodiment, an all-fibre acousto-optic phase modulator was produced using a ZnO film deposited by a modified single source chemical vapour deposition (SSCVD) process from a metal-organic precursor. The precursor used was $Zn_4O(CH_3COO)_6$ (basic zinc acetate, BZA).

Figure 2:
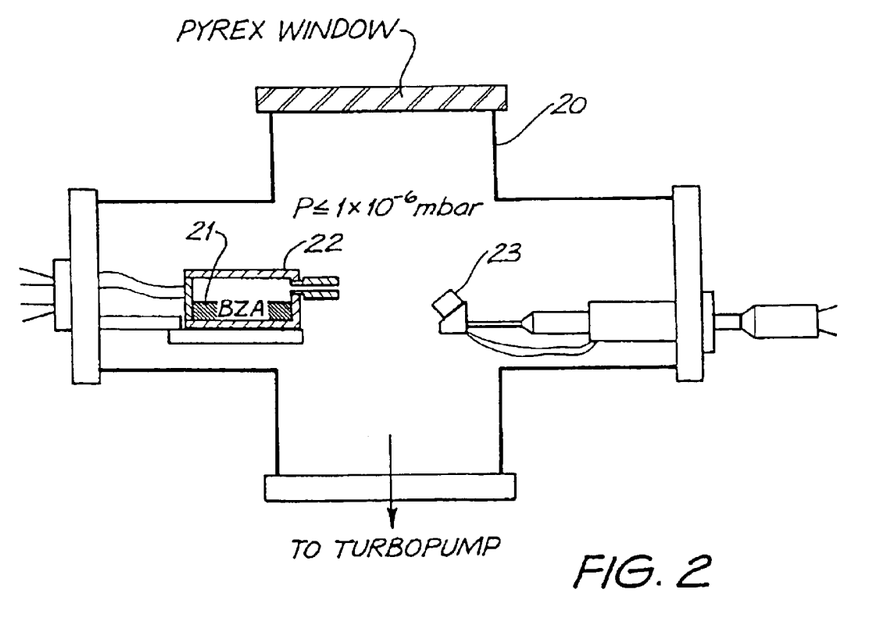
FIG. 2 illustrates a CVD system utilised for the preparation of CVD films in accordance with the preferred embodiment.
Figure 11A:
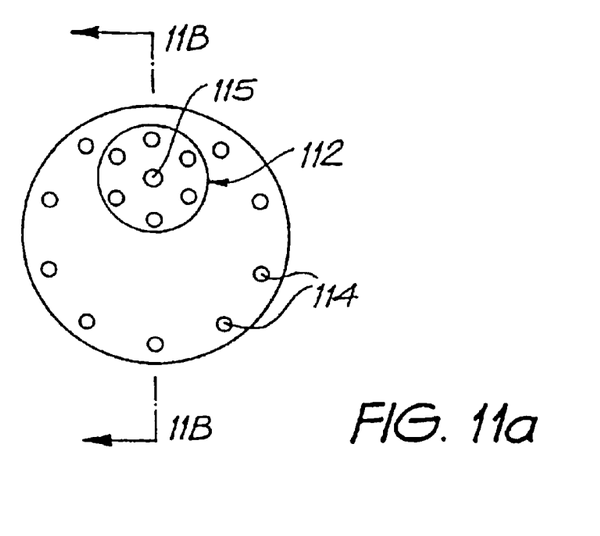
FIG. 11a to 11c represents various schematic views of the modified Knudsen cell.
Figure 11B:
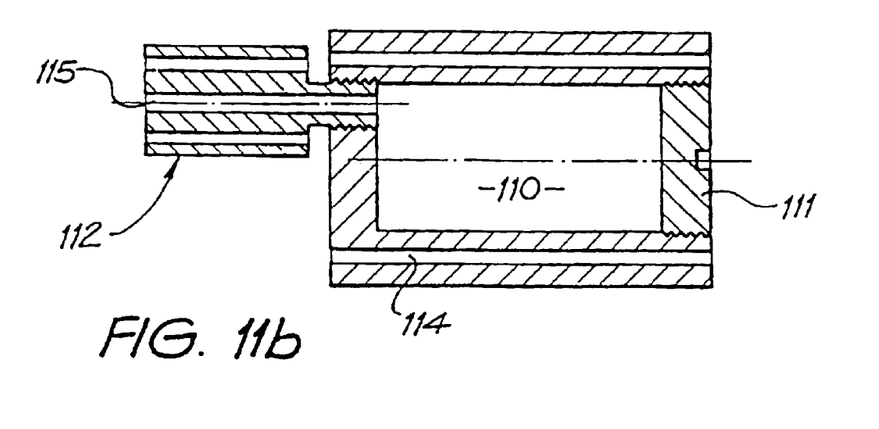
Figure 11C:
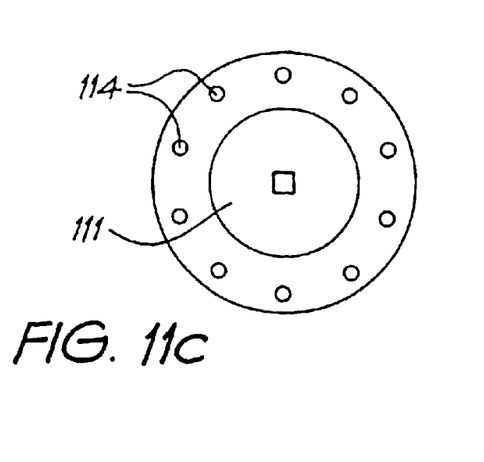

In FIG. 2, there is illustrated a schematic of the high vacuum chamber 20 utilized to construct the modulator. The films were deposited in a high vacuum ($P \leq 1 \times 10^{-6}$ mbar), and the BZA precursor 21 was vapourised in a modified Knudsen cell 22 by resistively heating the cell. FIG. 11a to 11c illustrate various views of the modified two zone Knudsen cell which includes a reservoir 110 formed via a screw in stopper 111, an outer cell 112 and a series of bores 114 for the receipt of ceramic insulated Ta resistance wires for heating. Also provided is an exit aperture 115 for the exit of materials.

The cell temperature was adjusted so that the partial pressure of BZA in the chamber 20 was approximately $1 \times 10^{-5}$ mbar. The film was deposited onto a heated sample substrate 23 (FIG. 2) heated to 450° C. in the presence of a water ambient of $2 \times 10^{-3}$ mbar. The film growth proceeded in the usual manner via the thermal decomposition of the metal-organic precursor. The decomposition mechanism to form stoichiometric ZnO was found to be promoted by the presence of the water vapour.

Figure 3A:
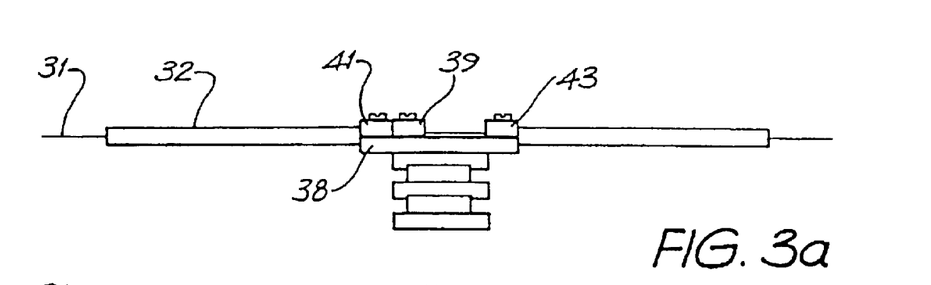
FIGS. 3a and 3b illustrate a sample holder constructed in accordance with the preferred embodiment.
Figure 3B:
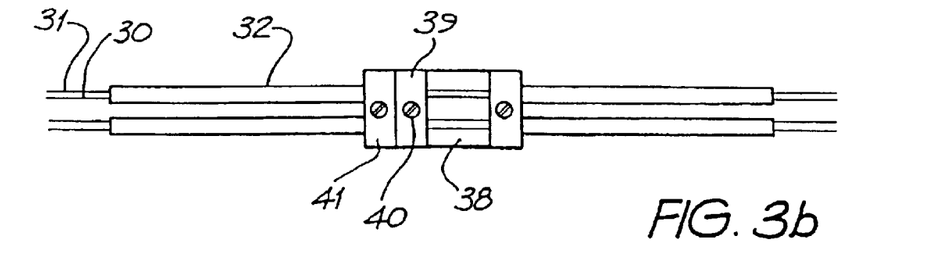

For deposition onto optical fibres (fused silica, 125 μm diameter), a special sample holder 23 as illustrated in FIGS. 3a and 3b was designed to fit the requirements arising from the fragile nature of this kind of substrate. FIG. 3a, illustrates a top perspective view of the sample holder while FIG. 3b illustrates a side perspective view. The requirements include:

i. fibres of a length of ~20 cm to be secured during the vacuum transfer and;

ii. the holder enables expansion of the fibres during the deposition of 450° C.

Figure 4:
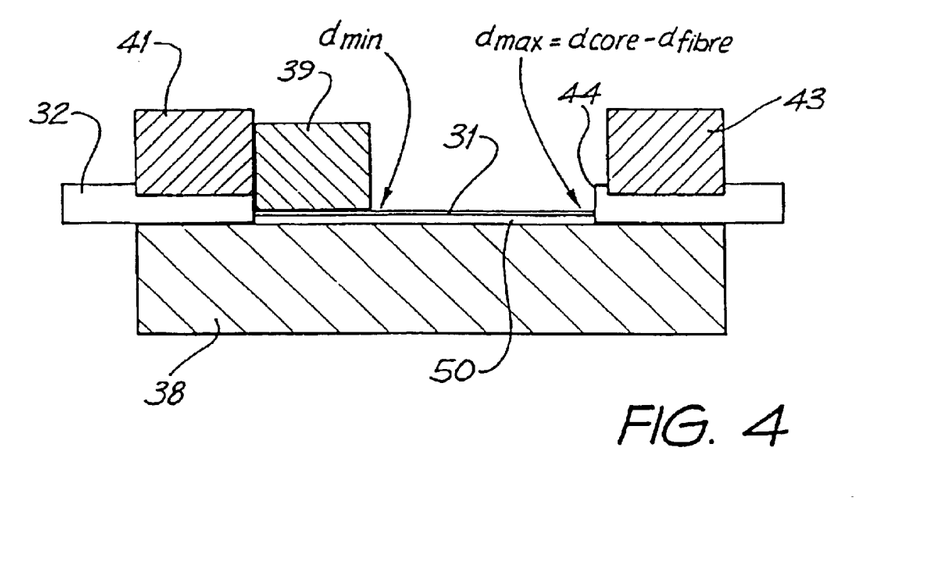
FIG. 4 illustrates a cross-sectional view of a fibre holder as utilised in the preferred embodiment.

Up to four fibres eg. 30, 31 are loaded into the ceramic tubes eg. 32 which have two cores of 250 μm diameter each. The tubes eg. 32 are positioned so that the bottom edge of each core is level with the surface of the copper heating block 38. The fibres are pressed onto the cooper heating block at one end by a copper clamp 39 fitted with a central screw 40 to ensure even pressure distribution on the fibres, with a minimum of two optical fibres in the holder being required. The surface of the polished copper clamp also provides a planar reference surface to control the crystallinity of the deposited film. X-Ray Diffraction (XRD) spectra taken from the copper clamp were used to estimate the degree of c-axis orientation in the deposited films. XRD patterns can not be obtained directly from the ZnO films deposited onto to the fibre, therefore, the obtained reference XRD spectra from the copper clamp can only be used as an indication whether the growth conditions were suitable for growing polycrystalline, c-axis oriented films onto planar substrates. Only one clamp 39 was used on the fibres to enable expansion of the fibres without creating intrinsic stress within the fibres during the deposition at 450° C. FIG. 4 shows a cross-sectional schematic view of the fibres eg. 31 mounted onto the copper heating block. One advantage of CVD growth was the non-directional growth aspects of the deposition process which enables depositions onto non-planar substrates without severe shadowing effects as obtained in sputter deposition techniques where the impulse of the impinging atoms is high. In CVD growth a high partial pressure of precursor in the vicinity of the heating block should allow for film growth onto every heated surface in the precursor vapour, since the kinetics of the precursor molecules in the gas phase can be described by random thermal movement.

Due to the fact that the fibres 31 are only clamped 39 onto the heating block 38 in the sample holder design, an air gap between bottom of the fibres and the surface of the heater will remain. The thickness of this air gap 50 can be expected to be in the order of the roughness of the materials pressed against each other, (estimated to be about 0.5 μm). However, in the case of only one clamp 39 used in the designed sample holder, the upper limit for the gap (denoted d) can be estimated to be $d = d_{core} - d_{fibre}$ from the geometry at the free end of the fibre on the heating block, neglecting any curvature of the fibre perpendicular to the surface of the heater 38 for the short length (1 cm) between clamp 39 and ceramic end 44 in the design. With the diameter of the core, $d_{core} = 250$ μm and the diameter of the fibre $d_{fibre} = 125$ μm, this upper limit is 125 μm. Thus deposition of the ZnO film over 360° of the fibre surface without rotating of the fibres was possible. It was found experimentally, that the heater temperature range from 350° C.–450° C. was suitable for the decomposition of the precursor on the fibre surface.

The ZnO films were deposited onto a ~15 nm thick Cr contact layer which was sputter deposited onto the fibre at room temperature in a high vacuum sputter system. During Cr sputter deposition, the fibres were mounted in an aluminium frame which was rotated by 180° between two deposition cycles to coat the fibre around the full 360° due to the shadowing effect. For deposition of the top Cr contact onto the ZnO film, a mask was attached to the frame which restricts the deposition area to a length of 6 mm centred on the film.

The ZnO films were characterised using X-ray diffraction (XRD) and X-ray photo-electron spectroscopy (XPS). The former technique was used to investigate the structural film properties of the ZnO films whereas the latter gave information of the chemical film composition. The XRD measurements were performed in a Siemens Kristalloflex diffractometer in air with an un-monochromated Cu Kα source and the XPS measurements in a VG ESCALAB 220XL ultra high vacuum analysis chamber equipped with a monochromated Al Kα source and a hemispherical electron energy analyser.

Figure 5:
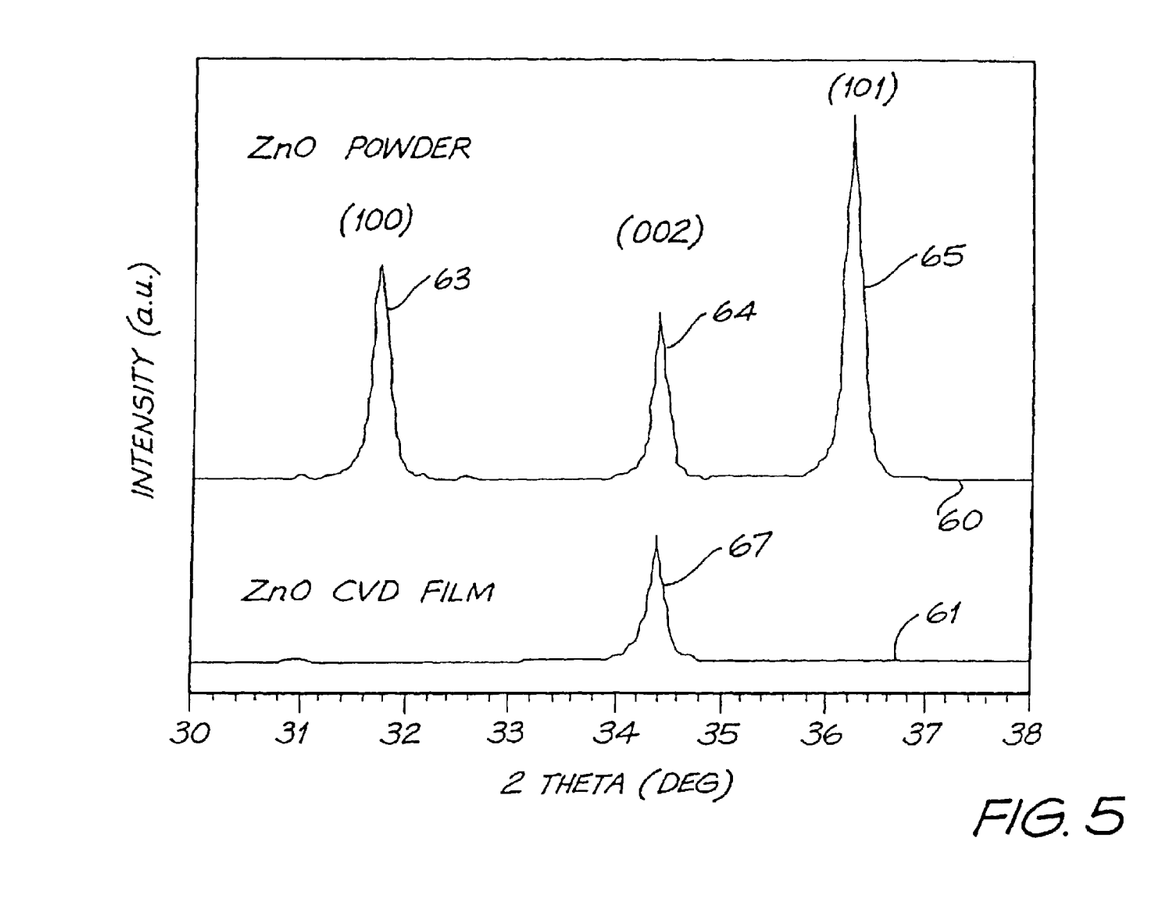
FIG. 5 illustrates the X-ray diffraction spectra of a zinc oxide film as recorded for films deposited in the preferred embodiment.

In FIG. 5, the obtained XRD spectra of a ZnO reference powder 60 (Aldrich, 99.9%) and of a CVD-grown film 61 onto a planar $SiO_2$ substrate under ideal conditions are shown. In the reference powder, the ZnO crystallites are randomly oriented with respect to the azimuth of the planar sample holder. Thus all crystal planes e.g. 63–65 can be detected in XRD analysis. The chosen 2θ angle range between 30° and 38° is commonly used to characterise ZnO since it covers the strongest peaks in the overall spectra. In the XRD spectrum 61, taken from the CVD-grown film, only one peak 67 is present associated with diffraction from the (002) crystal plane. This indicates that the film crystallites are oriented with the c-axis perpendicular to the substrate/planar sample surface. This is the preferred orientation for piezo-electric applications since the piezo-electric effect is strongest along the polar crystal axis.

Figure 6:
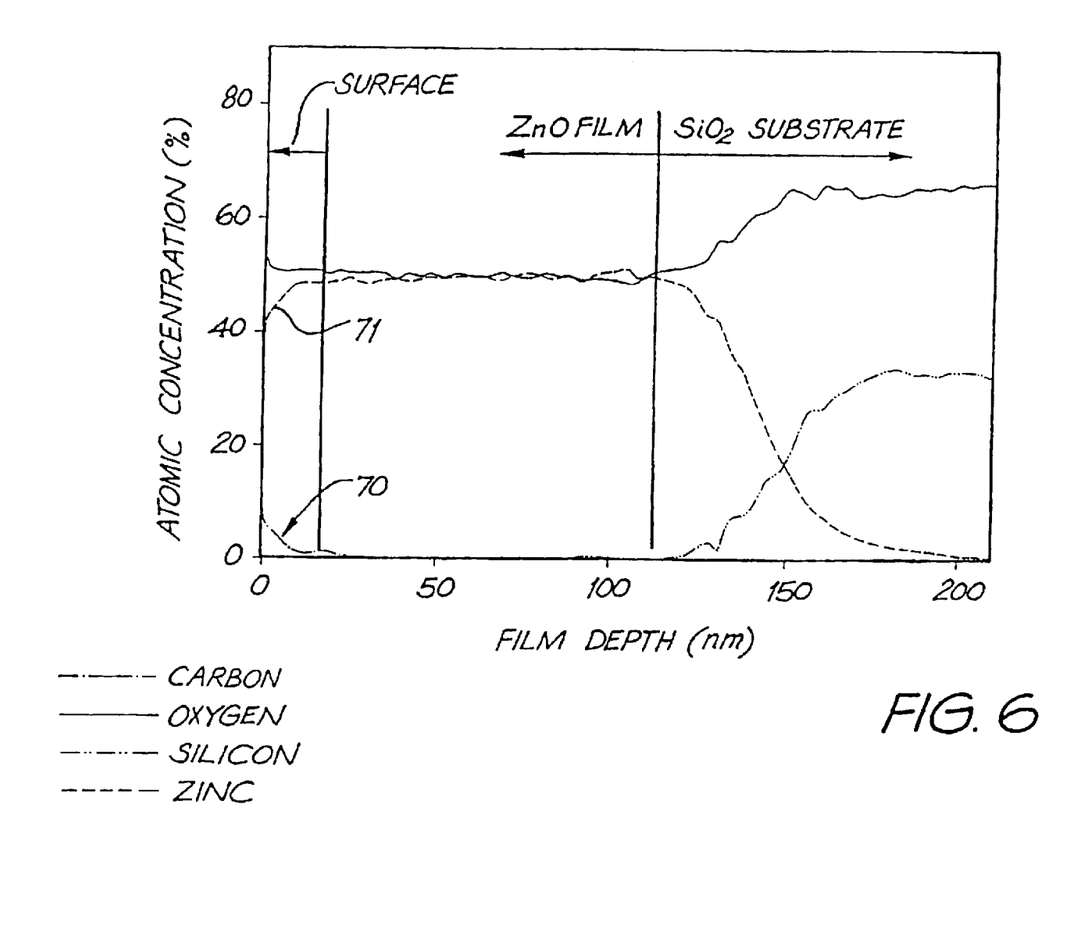
FIG. 6 illustrates a plot of the depth profile of a CVD zinc oxide film.

In FIG. 6, a XPS depth profile of a deposited ZnO film under identical conditions is shown. The atomic concentration of the film components is plotted as a function of sputter depth. At the outer surface of the film, the film composition differs from the 'bulk' in that an increased carbon contamination 70 and a decreased relative zinc concentration 71 is found. This can be explained by surface contaminations due to the exposure of the films to air after the film deposition. Such surface contaminations are mainly oxygen, hydroxides and hydrocarbons, giving rise to the obtained increased concentrations of oxygen and carbon at the film surface. In the deeper film layers, the film composition is that of stoichiometric ZnO with a carbon contamination level that is below the XPS detection limit.

The accuracy of the quantification method used can be controlled to the extent that the substrate composition measured after the ZnO film is completely removed is in agreement with the expected value for $SiO_2$ of 66.7% oxygen and 33.3% silicon. The above results suggest excellent chemical and structural properties of ZnO films deposited onto planar substrates using the modified SSCVD process.

Figure 7:
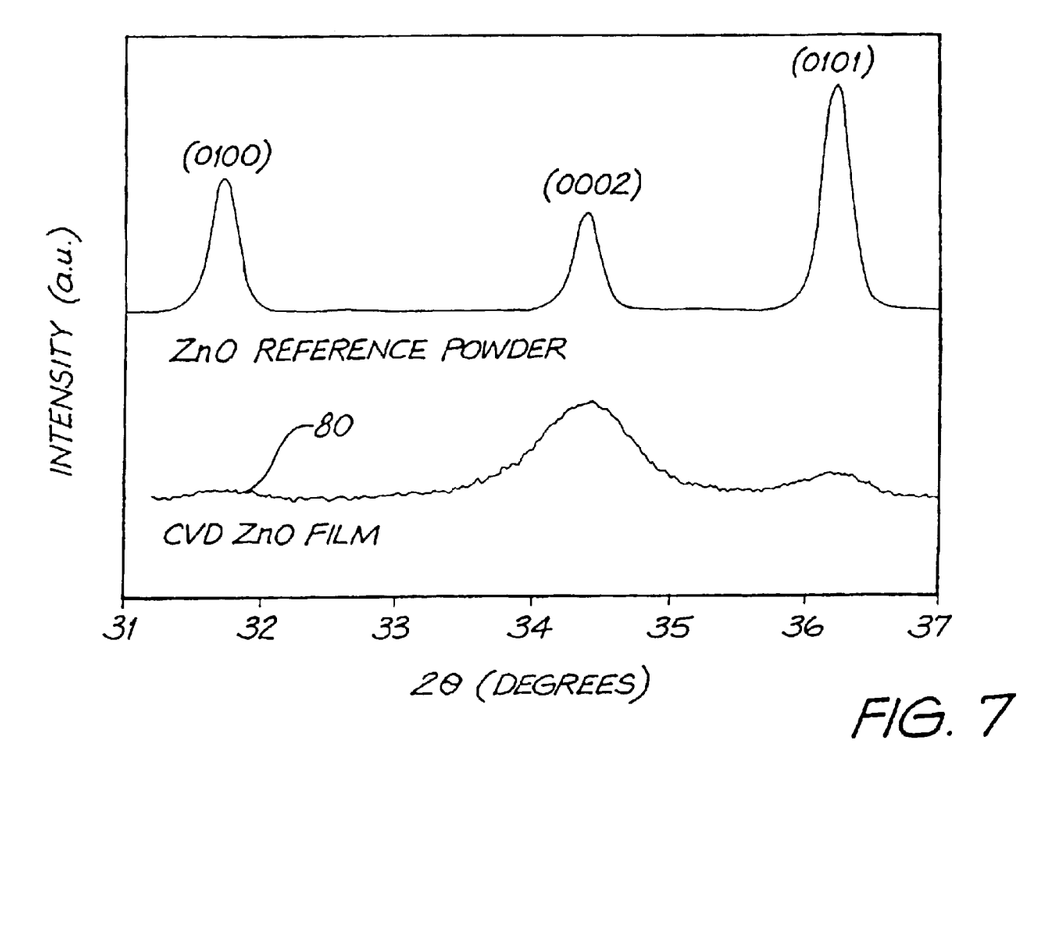
FIG. 7 illustrates a plot of X-ray diffraction intensities for ZnO films deposited in accordance with the preferred embodiment.

In FIG. 7, the XRD spectrum 80 of the film deposited onto the copper reference surface during the Zn deposition onto the optical fibres is shown. Again, only the one peak associated with the (002) plane is present, again suggesting that the deposition conditions were ideal. From scanning electron microscopy (SEM) images of the optical fibre with the deposited ZnO film, it was further evident, that the film was deposited over the full 360° range.

Figure 8:
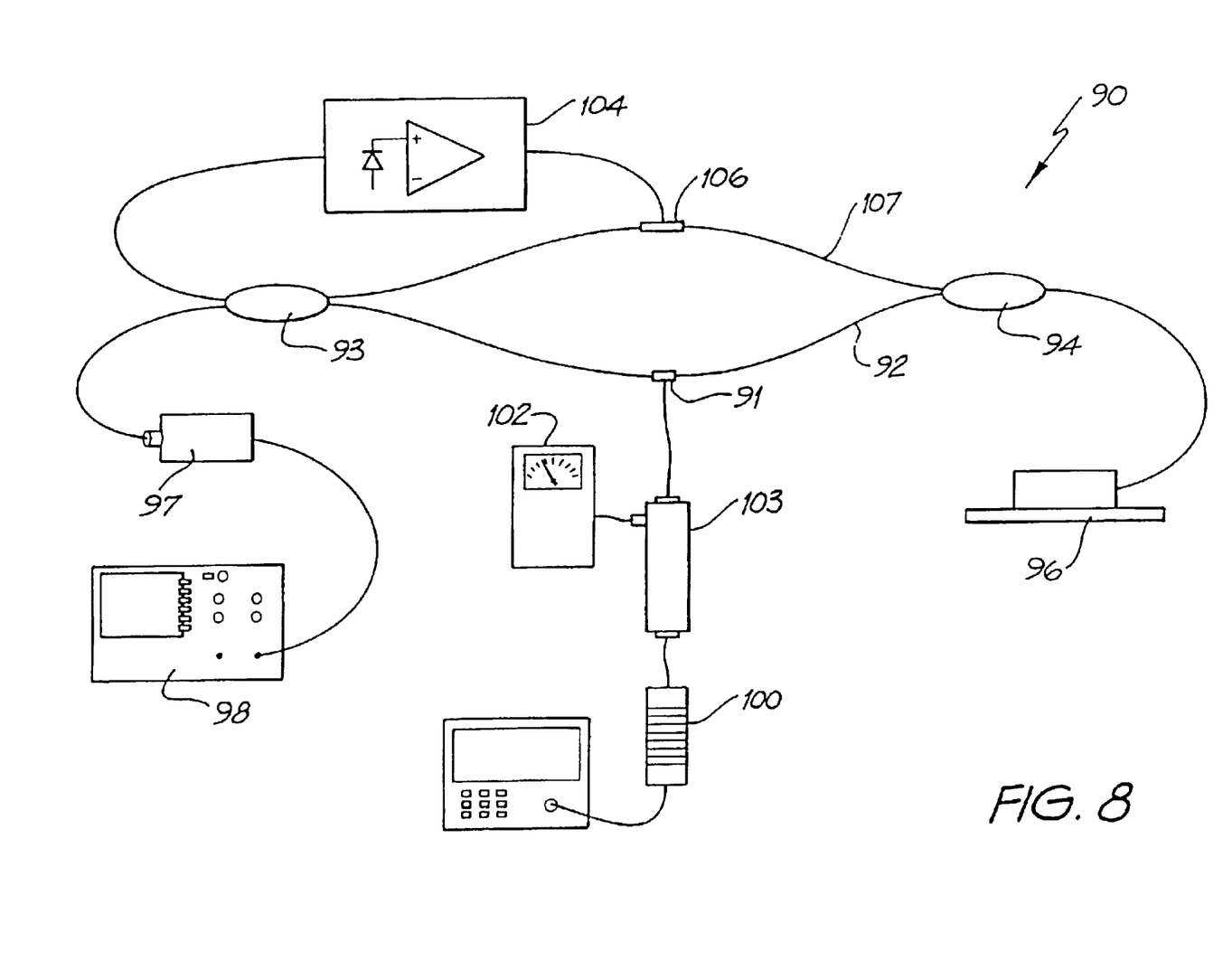
FIG. 8 illustrates one form of modulator constructed in accordance with the preferred embodiment.

In FIG. 8, there is illustrated an experimental setup used to characterise the response of the ZnO phase modulator. A transducer 91 was spliced into one end 92 of a Mach-Zehnder interferometer constructed from two 50% single-mode couplers 93, 94. A 1553 nm DFB laser diode 96 (coherence length>10 m) with isolator was used as the optical source. At the output of the interferometer a high speed (bandwidth>>10 GHz) photodetector 97 in conjunction with an RF spectrum analyser 98 (bandwidth 1.8 GHz) was used to measure the amplitude of the optical modulation. A RF source 100 capable of delivering 700 mW into 50Ω was used to drive the ZnO device 91 with the power monitored using an RF power meter 102 and a −20 dB directional coupler 103. To maintain a constant state of quadrature during measurements, the DC portion of the interference signal from the MZI was used as a feedback 104 to control a drive compensator (thermal) 106 in the reference arm 107 of the interferometer.

When a sinusoidal drive voltage is applied to the modulator 91, the amplitude of the signal at the output 97 of the Mach-Zehnder interferometer may be expressed as:

$$P = \frac{P_{max}}{2}[1 + \cos(\phi + \beta\sin(2\pi f_{mod}t)],$$

where $P_{max}$ is the launched intensity, $f_{mod}$ is the frequency of the drive signal and $\phi$ is the steady-state phase difference between the two arms of the interferometer (maintained constant by the feedback circuit). The modulation index $\beta$ is given by $$\beta = \frac{2\pi}{\lambda}\Delta nL$$

where $\Delta n$ is the peak change in effective core index $\lambda$=1553 nm is the wavelength, and L=0.006 m is the device length.

Equation 1 may be expressed as the sum of Bessel functions $J_n(\beta)$ which occur at harmonics of the drive signal frequency:

$$P = \frac{P_{max}}{2}[1 + \cos(\phi + \beta\sin(2\pi f_{mod}t))]$$
$$= \frac{P_{max}}{2}[1 + \cos\phi \cdot \cos(\beta\sin(2\pi f_{mod}t))\sin\phi\sin(\beta\sin(2\pi f_{mod}t))]$$
$$= \frac{P_{max}}{2}[1 - J_0(\beta)\cos\phi - 2J_1(\beta)\sin\phi\sin(2\pi f_{mod}t)]$$
$$[+2J_2(\beta)\cos\phi\cos(4\pi f_{mod}t) - 2J_3(\beta)\sin\phi\sin(6\pi f_{mod}t)][- \dots$$

Using the ratio of the measured amplitudes of first and second sidebands $J_1(\beta)\cos\phi/J_2(\beta)\sin\phi$, the modulation index $\beta$ can be calculated knowing the phase relationship between the two arms of the interferometer.

Across the measured frequency range of 100 to 700 MHz the device 90 exhibited a series of well defined resonances corresponding to the radial modes of the fibre-film composite. These maxima were separated by approximately 49 MHz in agreement with the expected value for a 125 $\mu$m fibre.

Figure 9:
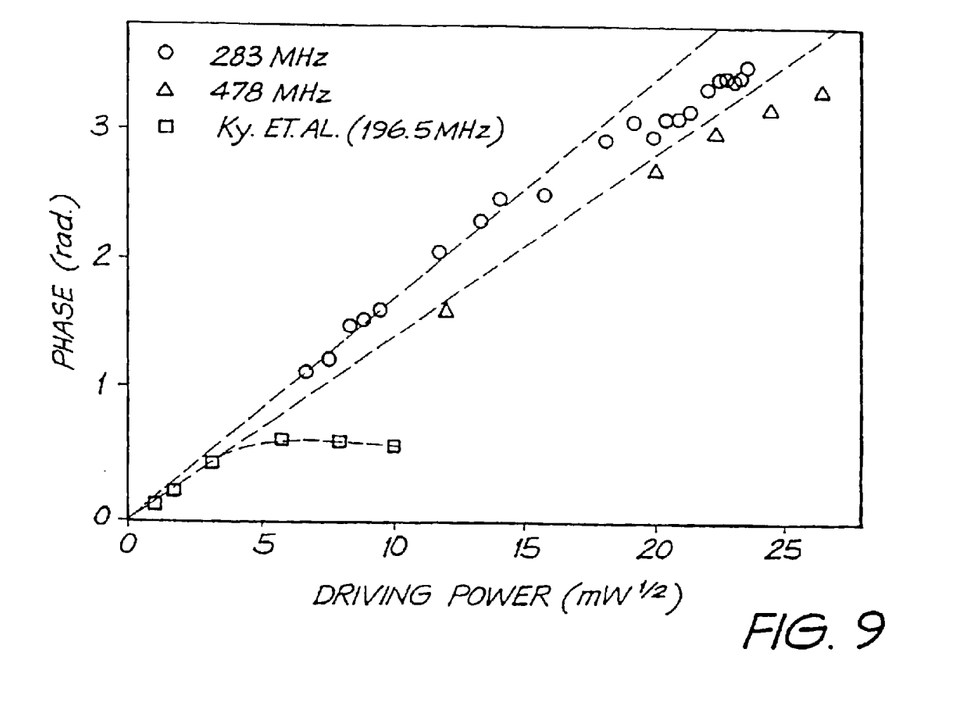
FIG. 9 illustrates a plot of measured phase modulation verses driving power for various resonant frequencies for devices constructed in accordance with the preferred embodiment and the prior art.

In FIG. 9, there is shown the measured phase modulation versus the square root of the driving power for two of the resonance frequencies at 283 MHz and 478 MHz. At 283 MHz, an almost linear modulation efficiency of 0.17 rad/√Mw with a maximum phase shift of 3.5 radians was measured for a driving power of 580 mW. Similar results of 0.14 rad/√Mw and 3.2 radians at 680 mW were attained at 478 MHz. FIG. 9 includes the data reported in N. H. Ky, H. G. Limberger, R. P. Salathe and G. R. Fox, "400 MHz all-fibre phase modulators using standard telecommunications fibre", in *The Proceedings of conference on Optical Fibre communications* 1996, Feb. 25–Mar. 1, 1996, San Jose, Calif., USA, (Ky et al.) for a comparable 6 mm long device using a 6 $\mu$m thick ZnO film deposited by sputtering measured at a frequency of 196.5 MHz. Clearly, while the performance of Ky et al device is limited for input powers above 36 mW, for the CVD device nonlinear effects are only evident at much higher input powers. In this region the obtained phase shift of approximately $\pi$ radians which is optimum for switch and modulator applications has been achieved.

Previously, in the literature, device efficiency has been compared using the empirical figure of rad/√Mw/cm of device length. In these terms of the preferred embodiment device efficiency of 0.28 rad/√Mw/cm (at 283 MHz) is approximately 35% higher than the previous most efficient device reported by Ky et. al. For the constructed modulator any saturation effects occur at much higher driving powers suggesting an excellent chemical film composition and structure of the CVD grown ZnO films.

Two aspects of how film thickness influences device performance may be considered. Firstly, for the same applied voltage, use of thinner films may enable higher electric fields in the device resulting in greater induced strain. Secondly, the elastic coupling between active film and fibre is also influenced by film thickness. The improved performance measured in the present device may therefore be related to a combination of film thickness and chemical composition.

In summary an all-fibre acousto-optic phase modulator has been developed using CVD grown ZnO films as the active material. The CVD deposition technique allows 360° coating of the optical fibre without the need for fibre rotation. This significantly reduces the complexity in manufacturing all-fibre devices. The maximum phase shift measured for a 6 mm long device at 283 MHz was 3.5 radians at a drive power of 580 mW. Unlike in previous designs using sputtered ZnO films the maximum attainable phase shift is not significantly limited by thermal and mechanical loss effects at higher driving powers. The measured efficiency of 0.28 rad/√Mw /cm of device length is 35% higher than previously reported which may be the result of our relatively thin films (0.4–0.9 $\mu$m).

Figure 10:
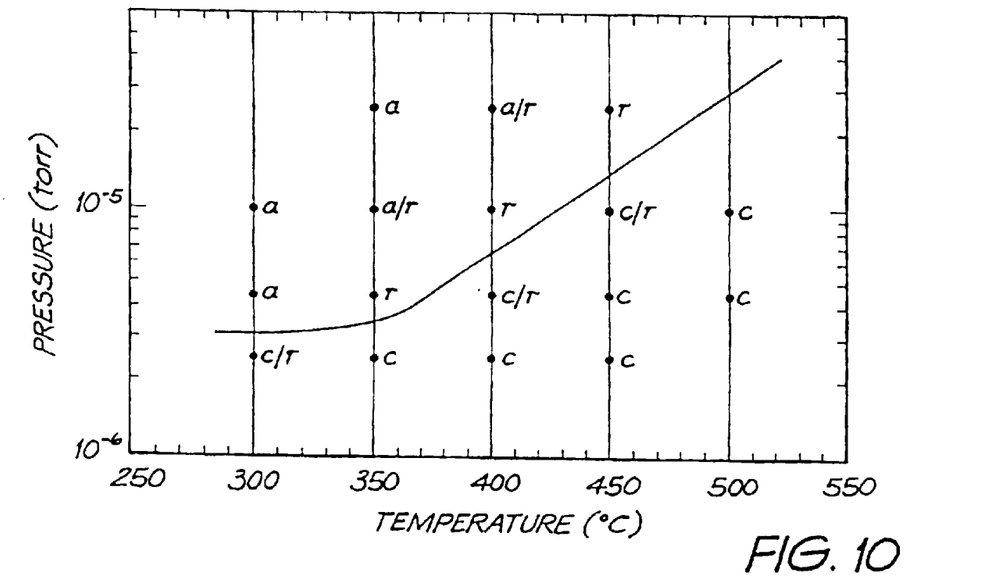
FIG. 10 illustrates a chart of the preferred orientation (or texture) of ZnO films grown as a function of both precursor pressure and substrate temperature.

It would be appreciated by a person skilled in the art that numerous variations and/or modifications may be made to the present invention as shown in the specific embodiment without departing from the spirit or scope of the invention as broadly described. For example, using the single source CVD method, depositions can be carried using a range of temperature conditions to produce similar quality films in addition to using other basic zinc compounds to grow films. For example, in FIG. 10 there is shown a plot of results obtained for ZnO films grown as a function of both precursor pressure and substrate temperature with the letters c or a indicating c or a axis orientation, c/r and a/r indicating predominantly c or a axis orientated with some random orientation and r indicating random orientation. The presented embodiment is, therefore, to be considered in all respects to be illustrative and not restrictive.

We claim:

1. A method of manufacturing a substantially continuous circumferential coating on a fiber having a length and a width and an exposed external circumferential surface, said method comprising the steps of:

heating the fiber in a static deposition geometry in a manner such that the exposed external circumferential surface of the fiber remains exposed to an extent sufficient to form the continuous coating thereon, the exposed external circumferential surface of the fiber being heated to substantially the same temperature, the temperature being sufficient for decomposition of a gaseous precursor material;

independently heating a source material to provide said gaseous precursor material; and directing said gaseous precursor material to said static fiber, whereby the substantially continuous circumferential coating is formed from decomposition of the gaseous precursor material on the exposed circumferential surface of the fiber.

2. A method as claimed in claim 1, wherein the coating has piezo-electric modulation characteristics.

3. A method as claimed in claim 1, wherein the coating has electro-optic modulation characteristics.

4. A method as claimed in claim 1, wherein the coating has semi-conducting properties.

5. A method as claimed in claim 1, wherein the coating comprises substantially zinc-oxide.

6. A method as claimed in claim 1, wherein the source material is provided by chemical vapour deposition.

7. A method as claimed in claim 1, wherein the source material is provided by single source chemical vapour deposition.

8. A method as claimed in claim 1, wherein the fiber is an optical fiber.

9. A method as claimed in claim 8 wherein at least one end of the optical fiber is clamped onto a substantially planar heating surface during the deposition.

10. A method as claimed in claim 8 wherein the optical fiber is clamped at a portion of the length of the fiber which is located at one end of a heating surface during the deposition.

11. A method as claimed in claim 8 wherein a movement of a free end of the optical fiber is limited to movement substantially along the axis of the optical fibre.

12. A method in accordance with claim 8, wherein the optical fiber is separated from a heating surface for heating the fiber by a substantially constant sized gap large enough to allow the vapor to envelop the surface of the fiber but small enough to allow the surface of the fiber to be heated to the decomposition temperature by the heating surface.

\* \* \* \* \*